United States Patent
Kepplinger et al.

(10) Patent No.: US 6,228,407 B1
(45) Date of Patent: May 8, 2001

(54) SHELF LIFE IN FOOD PRODUCTS

(75) Inventors: John Kepplinger, Portage; Bridget Nicole Casey; Karla Kaye Norstrom, both of Battle Creek, all of MI (US)

(73) Assignee: W. K. Kellogg Institute, Battle Creek, MI (US)

( * ) Notice: Subject to any disclaimer, the term of this patent is extended or adjusted under 35 U.S.C. 154(b) by 0 days.

(21) Appl. No.: 09/444,100

(22) Filed: Nov. 22, 1999

Related U.S. Application Data

(60) Provisional application No. 60/109,773, filed on Nov. 25, 1998.

(51) Int. Cl.$^7$ .................................................. A23D 7/005
(52) U.S. Cl. ........................... 426/321; 426/607; 426/611
(58) Field of Search ..................................... 426/321, 607, 426/611

(56) References Cited

U.S. PATENT DOCUMENTS

| | | | |
|---|---|---|---|
| 4,103,039 | 7/1978 | Mandai | 426/607 |
| 4,229,483 | 10/1980 | Oura | 426/250 |

OTHER PUBLICATIONS

Kershaw 1981 JAOCS pp. 706–710.
*European Journal of Clinical Nutrition* (1998) vol. 52, pp. 334–343; "Plant sterol–enriched margarines and reduction of plasma total–and LDL–cholesterol concentrations in nomocholesterolaemic and mildly hypercholesterolaemic subjects"; by J.A. Westrate and G.W. Meijer.

Severn 1979 Barlega Industrial Oil and Fat Products vol. 1, $4^{th}$ ed.; John Wiley & Sons, New York, pp. 241, 323, 328.

Beckett 1994 Industrial Chocolate Manufacture and Use, Blackie Academic & Professional New Your, pp. 246–251.

Peers 1977 The Non–glyceride Saponifiables of Shea Butter J. Sci Fd Agric. 28, 1000–1009.*

* cited by examiner

*Primary Examiner*—Carolyn Paden
(74) *Attorney, Agent, or Firm*—Howard & Howard

(57) ABSTRACT

A method and additive for enhancing the shelf life of food products is disclosed. The additive comprises a combination of a diluent fat with a plant-derived phytosterol to produce a plasticized blend agent. The plasticized blend agent can be incorporated into the formulation for a wide variety of prepared food products without negatively altering the taste characteristics of the foods products or the manufacturability of the food product. Incorporation of the plasticized blend agent into the food products provides an enhanced and more stable shelf life for the food product. The plasticized blend agent of the present disclosure offers a naturally derived product that significantly enhances the shelf life of food products, especially baked goods.

19 Claims, No Drawings

SHELF LIFE IN FOOD PRODUCTS

This application claims the benefit of U.S. Provisional Application No. 60/109,773, filed Nov. 25, 1998.

BACKGROUND OF THE INVENTION

This invention relates generally to food products and, more particularly, to enhancement of the shelf life of food products by incorporation of plant-derived phytosterols into the formulation for the food product.

Currently consumers are presented with a wide variety of prepared food products that are manufactured in locations quite distant from their point of distribution. Current manufacturing and distribution practices also result in many food products being purchased and consumed weeks or even months after their production. During this time delay, food products undergo a complex series of chemical reactions, many of which may lead to a deterioration of the desired texture, flavor and appearance of the food product. Deterioration in the overall quality of a food product may result in lower purchases by the consumer and increased food product waste. If the deterioration in product quality is significant the product may be discontinued by a company due to low consumer acceptance. To combat this deterioration in food quality, or shelf life, manufacturers typically include one or a combination of preservative agents in an attempt to enhance the shelf life of a given food product.

One problem with currently available preservatives is that they introduce the possibility of additional chemical reactions with the ingredients of a food product. Sometimes these additional chemical reactions lead to undesirable changes in the organoleptic qualities of the food product itself. For example, many preservatives produce an off taste in a food product or affect its color. In addition, consumers are increasingly demanding fewer "chemical" additives in prepared food products. Consumers prefer food products composed of "natural" ingredients. Thus, it is desirable to provide an alternative to current preservatives for enhancing the shelf life of foods products. It is furthermore desirable that the additive be derived from "natural sources" found more acceptable by consumers. In addition, it is desirable that any additive not negatively affect the organoleptic properties of the food product.

SUMMARY OF THE INVENTION

In general terms, this invention provides a method and natural additive for enhancing the shelf life of food products.

In a preferred embodiment, the method of the present invention comprises adding a plasticized blend agent comprising the combination of an edible diluent fat with a plant-derived phytosterol to a food product formulation in order to enhance the shelf life of the food product. In a most preferred embodiment, the plant-derived phytosterol is obtained from an extract of the Shea nut. It is furthermore preferable that a portion of the fat content of the food product be replaced with the plasticized blend of fat and Shea nut extract to maintain or reduce the fat content of the final food product.

Food products prepared in accordance with the method of the present invention have an enhanced shelf life with a significant maintenance of the organoleptic properties of a fresh produced food product. This affect is maintained over periods of time in excess of one year from the manufacturing date of the food product. The method of the present invention can be applied to a wide variety of food products including many baked food products.

These and other features and advantages of this invention will become more apparent to those skilled in the art from the following detailed description of the presently preferred embodiment.

DETAILED DESCRIPTION OF THE PREFERRED EMBODIMENT

Sterols are found in vegetable oils and are consumed at levels of 160–360 mg in a typical diet In addition to the ability of some phytosterols to lower serum cholesterol, phytosterols have been recognized as providing a positive impact on physiological diseases. Studies have been published on the ability of various sterols to reduce serum cholesterol and inhibit prostate and colon cancers.

Phytosterols broadly include any of several plant alcohols that have the properties of sterols and are defined herein to include sterols, stanols, and their esters. The most predominate plant sterols are sitosterol, campesterol, and stigmasterol. Phytosterols are related to cholesterol and have a ring structure that is the same as cholesterol with the differences residing in the structure of a side chain branch from one of the carbon atoms in one of the rings. The triterpene family of compounds is structurally somewhat different from the above noted other phytosterols, although they are often classified as phytosterols. One representative triterpene often classified as a phytosterol is the compound $\alpha$-amyrin. Phytosterols can be extracted from a wide variety of plant sources including soy beans, rice bran, and rapeseeds. The Shea nut contains high levels of the phytosterol $\alpha$-amyrin, which can be readily extracted from the Shea nut.

Phytosterols typically have a thick, hard consistency. However, phytosterols are fat miscible and, therefore, can be mixed and blended with a fat, such as animal, vegetable, or synthetic fat, to yield a plasticized blend agent. The fats that are mixed with phytosterols to produce the plasticized blend agent are referred to as diluent fats in this specification and the claims.

The phytosterols used in the present invention are preferably esterified but can be utilized in their non-ester form. The esterified phytosterols are preferred because they are more easily combined with appropriate diluent fats, and subsequently more easily incorporated into the food product. Preferably, the phytosterols are extracted in their natural state which retains high concentrations of the esterified form using techniques known to those skilled in the art. Alternatively, the phytosterols can be esterified utilizing a number of mechanisms and ingredients well know to those skilled in the art such as esterification with fatty acids, cinnamic acid, acetic acid, or sugar through a glycosidic linkage.

As discussed above, Shea nuts are a plant source having high levels of $\alpha$-amyrin. The Shea nuts are typically processed to produce an oil stream and a waste stream. The oil stream is used to formulate Shea nut oil and Shea nut butter, the waste stream has often been discarded. The concentrated $\alpha$-amyrin material is found in the waste stream of the Shea nuts. Commercially, a Shea nut extract prepared from the waste stream and having a high level of the phytosterol $\alpha$-amyrin can be obtained from Loders Croklaan, Wormerveer, The Netherlands. The Shea nut extract is combined with an edible diluent fat to produce a plasticized blend agent. The diluent fat can be a vegetable oil, such as, for example, sunflower oil or other edible oils. In a preferred embodiment the diluent fat is sunflower oil and the sunflower oil is combined with the Shea nut extract to achieve a plasticized blend agent containing 50% phytosterols.

In this specification and the accompanying claims the term plasticized blend agent refers to at least one plant-derived phytosterol in combination with a diluent fat to produce a plasticized blend agent.

The plasticized blend agent possesses a similar functionality to a vegetable or animal shortening or spread. The plasticized blend agent can be readily substituted for shortening in baked goods and can replace all or a portion of the fat normally found in food products such as cereal products, margarines/spreads, dairy products such as ice cream, yogurt and fabricated cheese, snack foods such as popcorn, chips, and other extruded products, shortenings or oils for deep fat frying, fabricated meat products such as bologna or sausage, beverages, salad dressings, and the like. Thus, the plasticized blend agent can be easily and readily incorporated into existing formulae for food products. Alternatively, the plasticized blend agent can simply be added to the existing formulation of the food product.

An additional benefit of the plasticized blend agent is the ability to enhance the nutritional value of the food product by incorporating the plasticized blend agent. Many diluent fats from vegetable and animal sources are recognized as nutritionally beneficial due to their high content of mono- and polyunsaturated fatty acids when first isolated. Examples of these diluent fats are high oleic sunflower oil, canola oil and fish oil. Unfortunately, formulation of foods using high levels of these diluent fats significantly changes the organoleptic qualities such as texture of the product due to the diluent fat's lack of a crystalline structure at room temperature. Thus, these liquid oils, diluent fats, are typically hydrogenated to convert the unsaturated fatty acids into a saturated form which modifies their consistency from a liquid into a plasticized texture. The now plasticized oil can then be incorporated at high levels in food products. Unfortunately, the hydrogenation method removes the nutritionally beneficial unsaturated fatty acids and generates trans fatty acids. Consumption of trans fatty acids have been shown to contribute to many cardiovascular diseases causing many food companies to find methods to reduce the content of trans fatty acids in their products. The utility of the plasticized blend agent is that combining the phytosterols with the liquid diluent fat converts the physical form of nutritionally beneficial unsaturated fatty acids in the diluent fat from liquid form into a plasticized form without destroying their beneficial unsaturation.

The plasticized blend agent of the present invention can include the phytosterol in amounts ranging from approximately 2% to approximately 95% of the plasticized blend agent, with the remainder composed of the diluent fat. In the examples disclosed below the plasticized blend agent comprises a 37.5:62.5 mixture of sunflower oil with the Shea nut extract, but it should be understood that other sources of phytosterols such as soybeans, rice bran, and rapeseeds could also be used. In addition, edible oils other that sunflower oil can be used to prepared the plasticized blend agent.

Additional agents such as emulsifiers, stabilizers or solubulizers or the like may be added to the plasticized blend agent to add additional desirable properties such as stability and workability to the plasticized blend agent as is known to those skilled in the art.

EXAMPLE 1

Oatmeal Cookies Produced With the Plasticized Blend Agent

The addition of the plasticized blend agent of the present invention in a formulation for oatmeal cookies was examined in Example 1. Referring to Table 1, the ingredients for the control oatmeal cookies and for the test oatmeal cookies having a portion of the corn oil margarine replaced with a plasticized blend agent designed in accordance with the present invention are illustrated. The plasticized blend agent was a blend of 37.5% sunflower oil with 62.5% Shea nut extract.

TABLE 1

| Ingredient | Control Cookies, weight as % of total weight | Test Cookies, weight as % of total weight |
|---|---|---|
| Corn Oil Margarine | 27.76 | 10.00 |
| Plasticized Blend Agent | 0.00 | 17.76 |
| Sugar | 19.48 | 19.48 |
| Molasses, Lt. Brown Sugar | 1.46 | 1.46 |
| Invert Sugar | 3.40 | 3.40 |
| Salt | 0.29 | 0.29 |
| Baking Soda | 0.39 | 0.39 |
| Whole Eggs | 4.87 | 4.87 |
| Sterling 2X Vanilla | 0.49 | 0.49 |
| All Purpose Flour | 18.10 | 18.10 |
| Cinnamon | 0.29 | 0.29 |
| Nutmeg | 0.07 | 0.07 |
| Quick Oats | 11.70 | 11.70 |
| Rolled Oats | 11.70 | 11.70 |
| Totals | 100.00 | 100.00 |

Both the control cookies and the test cookies were prepared by combining the corn oil margarine or corn oil margarine and plasticized blend agent with the sugar, molasses, invert sugar, salt, and baking soda. The mix was creamed at a medium speed in a mixer for five minutes. The whole eggs and vanilla were added and the mixture was again mixed at medium speed for one minute. Then the all purpose flour, cinnamon, and nutmeg were added to the mixture and mixed at low speed for one minute. Finally, the quick oats and rolled oats were added to the mixture and it was mixed for 30 seconds at low speed. Following a scrape down of the mixing bowl the mixture was again mixed for 30 seconds at low speed. Approximately 31.5 grams of each cookie mixture were used per cookie. The cookies were baked for 9½ to 10 minutes at 350° F. in a convection oven. Cookies were allowed to cool for 5 minutes on the pan and then transferred to a rack. Cookies were then packaged and stored.

After one year of storage the control cookies were compared to the test cookies by a panel of trained sensory testers. The control product had a grey and dry appearance. The test product had a pleasing toasted brown appearance. The texture of the control product was very dry with a highly fracturable and gritty composition. The control product was not cohesive and was quite fibrous. Upon breakage the control product released large numbers of loose particles. The test product, by contrast, was moister and did not have the gritty and fibrous texture of the control product. The test product exhibited a higher initial crisp with a harder initial bite and a cleaner break. In addition, the test product was more dissolvable and had a more pleasant mouth taste. In terms of flavor the control product had the taste to the panelists of a "diet" cookie.

EXAMPLE 2

Muffins Produced With the Plasticized Blend Agent

The addition of the plasticized blend agent of the present invention in a formulation for muffins was examined in Example 2. Referring to Table 2, the ingredients for the control muffins and for test muffins having the oil component replaced with a plasticized blend agent designed in accordance with the present invention are illustrated. The plasticized blend agent was a blend of 37.5% sunflower oil with 62.5% Shea nut extract.

TABLE 2

| Ingredient | Control muffins, weight as % of total weight | Test muffins, weight as % of total weight |
|---|---|---|
| Pastry Flour | 17.10 | 17.10 |
| Cake Flour | 7.31 | 7.31 |
| Granulated Sugar | 21.92 | 21.92 |
| Invert Sugar | 2.56 | 2.56 |
| Glycerol | 2.56 | 2.56 |
| Oil | 19.49 | 0.00 |
| Plasticized Blend Agent | 0.00 | 19.49 |
| Liquid Whole Egg | 12.00 | 12.00 |
| NFDM | 0.80 | 0.80 |
| Salt | 0.20 | 0.20 |
| Water | 11.02 | 11.02 |
| Baking Soda | 0.40 | 0.40 |
| SALP | 0.40 | 0.40 |
| Fumaric Acid | 0.19 | 0.19 |
| Xanthan Gum | 0.12 | 0.12 |
| Paselli SA | 2.40 | 2.40 |
| Polar Gel P | 0.97 | 0.97 |
| Vanilla | 0.10 | 0.10 |
| Nutrishield | 0.20 | 0.20 |
| SSL | 0.06 | 0.06 |
| Panodan SDK | 0.06 | 0.06 |
| PGMS (P-06) | 0.06 | 0.06 |
| Max Life 25 | 0.05 | 0.05 |
| Vitamin Premix (uncolored) | 0.04 | 0.04 |
| Total | 100.00 | 100.00 |

The muffins were prepared by combining and sifting the dry ingredients together into a mixing bowl. Then the water, glycerol, and invert sugar were combined together. The oil or plasticized blend agent was then combined with the flavorings and the panodan SDK. The eggs were kept separate from the other ingredients. The dry ingredients were mixed with a paddle attachment at a low speed for approximately 2 minutes to ensure a homogeneous mixture. Then the eggs, water, glycerol, and invert sugar were added to the dry ingredients. The combined mixture was then mixed at the low speed setting until all of the dry ingredients were moistened. Next the oil or plasticized blend agent, flavorings, and panodan SDK were added to the mixture. The resulting mixture was stirred by hand until most of the oil or plasticized blend agent had become incorporated. The mixer was then mixed at the low speed setting until the dough started to adhere to the sides of the bowl. Then 70 gram portions of the muffin batter were weighed into each muffin tin containing a muffin liner. The muffins were baked at 400° F. for 24 minutes. The muffins were allowed to cool and then packaged.

After two months of storage a panel of trained sensory testers evaluated the "freshness" of the control muffins relative to the test muffins. The panelists found the control muffins to be denser and more oily than the test muffins. In addition, the control muffins crumbled easier and left an oily mouthcoating after swallowing. These organoleptic results suggest the control muffins were "staler" than the test muffins, showing the benefit of the plasticized blend agent.

Table 3 shows the actual moisture content and fat content of the control muffins and the test muffins. The results indicate that in fact the control muffins had approximately the same moisture content as the test muffins despite tasting less fresh. Despite replacement of the removed fat with an equal amount of the plasticized blend agent, the fat content of the test muffins was significantly lower than that of the control muffins. This is in part because phytosterols are not quantified as fats, so only the diluent fat contributes fats to the product. Thus, use of the plasticized blend agent has the added benefit of also reducing the fat content in addition to enhancing the shelf life of the products it is used in.

TABLE 3

| Criterion | Control Muffins | Test Muffins |
|---|---|---|
| pH Units | 5.80 | 6.00 |
| Moisture % | 18.3 | 17.1 |
| Water Activity AW | 0.81 | 0.79 |
| Total Fat % (Triglycerides) | 21.4 | 12.4 |
| Saturated fat % (fatty acids) | 2.0 | 2.2 |
| Mono-unsaturated fat % (fatty acids) | 15.2 | 3.3 |
| Poly-unsaturated fat % (fatty acids) | 3.2 | 6.4 |

EXAMPLE 3

Waffles Produced With the Plasticized Blend Agent

The addition of the plasticized blend agent of the present invention in a formulation for waffles was examined in Example 3. Referring to Table 4, the ingredients for the control waffles and for the test waffles having all of the normal waffle shortening replaced with a plasticized blend agent designed in accordance with the present invention are illustrated. The plasticized blend agent was a blend of 37.5% sunflower oil with 62.5% Shea nut extract.

TABLE 4

| Ingredient | Control Waffles, weight as % of total | Test Waffles, weight as % of total |
|---|---|---|
| Whole Milk | 40.00 | 40.00 |
| Satin White Flour | 32.756 | 32.756 |
| Waffle Shortening | 11.778 | 0.00 |
| Plasticized Blend Agent | 0.00 | 11.778 |
| Fresh Egg White | 3.667 | 3.667 |
| Fresh Egg Yolk | 7.289 | 7.289 |
| ADM Baking Powder | 1.489 | 1.489 |
| Granulated Sugar | 2.800 | 2.800 |
| Salt | 0.222 | 0.222 |
| Total | 100.00 | 100.00 |

Both the control and the test waffles were prepared as follows. The egg whites were whipped in a mixer at speed 3 for 2.5 minutes and set aside. The dry ingredients were combined and mixed in a mixer at speed 1 for 0.5 minutes and then set aside. The egg yolk, milk and melted shortening or plasticized blend agent were then combined with the mixed dry ingredients and the resulting mixture was mixed in a mixer at speed 2 for 2 minutes. The whipped egg whites were added to the other ingredients and the resulting mixture as mixed in a mixer at speed 1 for 20 seconds to form the waffle batter. The waffle batter was placed on a waffle grid at a temperature of between about 300° F. to 320° F. and baked for 60 seconds.

After preparation the control waffles and the test waffles were cartoned in boxes of eight with a freezer resealable bag as the inner wrap and stored in a freezer set at 0° F. After storage in the freezer for approximately 2 days, both the control waffles and the test waffles were subjected to eight freeze-thaw cycles as follows: the frozen waffles were moved from the freezer to a refrigerator set at 40° F. for six hours. The internal temperature of the waffles reached approximately 38° F. over this period of time. After six hours the waffles were removed from the refrigerator and placed back in the freezer. The next day the cycle was repeated. This freeze-thaw procedure was repeated for a total of eight repetitions after which the waffles were evaluated by a panel of trained sensory testers.

The waffles were prepared for sensory evaluation by removing the product from the freezer and heating in a toaster for 1.5 minutes. The samples were evaluated for visual and textural differences. The test waffles maintained their initial shape integrity better than the control waffles, which showed signs of damage after the freeze-thaw testing. The test waffles were more crisp after toasting than the control waffles. The test waffles were more airy and less deforming, the extent to which a sample deforms rather than breaks on the first bite, than the control waffles. The test waffles also were less chewy or elastic than the control waffles. In addition, the control waffles had more of an oily mouthcoating upon swallowing compared to the test waffles The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for enhancing the shelf life of a food product comprising the steps of:
    a.) combining an edible diluent fat with between 2 weight percent to 95 weight percent of an esterified plant-derived phytosterol to form a plasticized blend agent, said amount of phytosterol based on the total weight of said plasticized blend agent;
    b.) adding a positive amount of said plasticized blend agent to a formulation for a food product, said positive amount sufficient to increase a shelf life of said food product; and
    c.) preparing said food product, said food product having an enhanced shelf life when compared to said food product made without said plasticized blend agent.

2. A method as recited in claim 1, wherein step a.) further comprises combining a Shea nut extract in an amount of between 2 weight percent and 95 weight percent, based on the total weight of said plasticized blend agent, with said edible diluent fat to form said plasticized blend agent.

3. A method as recited in claim 2, wherein step a.) further comprises combining said Shea nut extract with said edible diluent fat in a ratio of 62.5:37.5 to form said plasticized blend agent.

4. A method as recited in claim 2, wherein step a.) comprises combining said Shea nut extract in an amount of between 2 weight percent and 95 weight percent, based on the total weight of said plasticized blend agent, with sunflower oil to form said plasticized blend agent.

5. A method as recited in claim 1, wherein step b.) further comprises replacing a positive amount of up to 100% of a normal fat content of said formulation with a positive amount of said plasticized blend agent.

6. A method as recited in claim 5, wherein step b.) comprises replacing a positive amount of up to 100% of a normal fat content of said formulation with an equal amount of said plasticized blend agent.

7. A method as recited in claim 1, wherein steps b.) and c.) further comprise adding said positive amount of said plasticized blend agent to a formulation for a baked good and preparing said baked good, said baked good having an enhanced shelf life compared to said baked good prepared without said plasticized blend agent.

8. A method as recited in claim 7, wherein said baked good comprises a cookie, a muffin, or a waffle and steps b.) and c.) comprise adding said positive amount of said plasticized blend agent to a formulation for said cookie, said muffin, or said waffle and preparing said cookie, said muffin, or said waffle, wherein said cookie, said muffin, or said waffle have an enhanced shelf life.

9. A method for enhancing the shelf life of a food product comprising the steps of:
    a.) forming a plasticized blend agent by combining an edible diluent fat with an amount of between 2 weight percent and 95 weight percent of a Shea nut extract, based on the total weight of said plasticized blend agent;
    b.) removing a positive amount up to 100% of a fat content from a formulation for a food product;
    c.) adding a positive amount of said plasticized blend agent to said formulation for said food product, said positive amount sufficient to increase a shelf life of said food product; and
    d.) preparing said food product, said food product having an enhanced shelf life when compared to said food product made without said plasticized blend agent.

10. A method as recited in claim 9, wherein step a.) further comprises combining said Shea nut extract with said edible diluent fat in a ratio of 62.5:37.5 to form said plasticized blend agent.

11. A method as recited in claim 9, wherein step a.) comprises combining said Shea nut extract in an amount of between 2 weight percent and 95 weight percent, based on the total weight of said plasticized blend agent, with sunflower oil to form said plasticized blend agent.

12. A method as recited in claim 9, wherein step c.) comprises adding said plasticized blend agent in an amount that is equal to said positive amount of said fat content removed from said formulation for said food product in step b.).

13. A method as recited in claim 9, wherein steps b.), c.) and d.) further comprise removing said positive amount of said fat content from a formulation for a baked good; adding said positive amount of said plasticized blend agent to said formulation for said baked good; and preparing said baked good, said baked good having an enhanced shelf life compared to said baked good prepared without said plasticized blend agent.

14. A method as recited in claim 13, wherein said baked good comprises a cookie, a muffin, or a waffle and steps b.), c.), and d.) comprise removing said positive amount of said fat content from a formulation for said cookie, said muffin, or said waffle; adding said positive amount of said plasticized blend agent to said formulation for said cookie, said muffin, or said waffle; and preparing said cookie, said muffin, or said waffle, wherein said cookie, said muffin, or said waffle have an enhanced shelf life.

15. A method for enhancing the shelf life of a food product comprising the steps of:
    a.) forming a plasticized blend agent by combining a sunflower oil in a ratio of 62.5:37.5 to form said plasticized blend agent;

b.) removing a positive amount up to 100% of a fat content from a formulation for a food product;

c.) adding a positive amount of said plasticized blend agent to said formulation for said food product, said positive amount sufficient to increase a shelf life of said food product; and d.) preparing said food product, said food product having an enhanced shelf life when compared to said food product made without said plasticized blend agent.

16. A method as recited in claim 15, wherein steps b.), c.) and d.) further comprise removing said positive amount of said fat content from a formulation for a baked good; adding said positive amount of said plasticized blend agent to said formulation for said baked good; and preparing said baked good, said baked good having an enhanced shelf life compared to said baked good prepared without said plasticized blend agent.

17. A method as recited in claim 16, wherein said baked good comprises a cookie, a muffin, or a waffle and steps b.), c.), and d.) comprise removing said positive amount of said fat content from a formulation for said cookie, said muffin, or said waffle; adding said positive amount of said plasticized blend agent to said formulation for said cookie, said muffin, or said waffle; and preparing said cookie, said muffin, or said waffle, wherein said cookie, said muffin, or said waffle have an enhanced shelf life.

18. A method for increasing the level of unsaturated fatty acids in a food product comprising the steps of:

a.) combining an edible diluent fat containing unsaturated fatty acids with between 2 weight percent to 95 weight percent of an esterified plant-derived phytosterol to form a plasticized blend agent;

b.) adding a positive amount of said plasticized blend agent to a formulation for a food product, said positive amount increasing the level of unsaturated fatty acids in said food product; and c.) preparing said food product, said food product having an increased level of unsaturated fatty acids when compared to said food product made without said plasticized blend agent.

19. A method for increasing the level of unsaturated fatty acids in a food product comprising the steps of:

a.) combining an edible diluent fat containing unsaturated fatty acids with between 2 weight percent to 95 weight percent of a Shea nut extract to form a plasticized blend agent;

b.) adding a positive amount of said plasticized blend agent to a formulation for a food product, said positive amount increasing the level of unsaturated fatty acids in said food product; and c.) preparing said food product, said food product having an increased level of unsaturated fatty acids when compared to said food product made without said plasticized blend agent.

* * * * *